(12) United States Patent
Qin

(10) Patent No.: US 8,341,310 B2
(45) Date of Patent: Dec. 25, 2012

(54) METHOD FOR ADJUSTING THE TRANSMISSION SPEED OF THE ELECTRONIC AID

(75) Inventor: Junjie Qin, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 0 days.

(21) Appl. No.: 13/078,684

(22) Filed: Apr. 1, 2011

(65) Prior Publication Data
US 2011/0246684 A1     Oct. 6, 2011

(30) Foreign Application Priority Data
Apr. 6, 2010   (CN) .......................... 2010 1 0139288

(51) Int. Cl.
*G06F 15/16* (2006.01)
*G06F 3/00* (2006.01)
(52) U.S. Cl. ............... 710/18; 709/227; 709/230; 710/8
(58) Field of Classification Search .................. 370/254, 370/255, 257; 709/227, 228, 230, 231, 232, 709/233, 236, 237; 710/1, 8, 10, 11, 14, 710/15, 16, 18, 62, 63; 714/1, 2, 3, 4.1, 4.5, 714/5.1, 48, 55, 56
See application file for complete search history.

(56) References Cited

U.S. PATENT DOCUMENTS

| 6,671,831 | B1 * | 12/2003 | Sartore et al. ................... 714/44 |
| 2005/0080935 | A1 * | 4/2005 | Fukae et al. ...................... 710/1 |
| 2011/0246684 | A1 * | 10/2011 | Qin ................................. 710/18 |

* cited by examiner

*Primary Examiner* — Chun-Kuan Lee
*Assistant Examiner* — Richard B Franklin

(57) ABSTRACT

A method for adjusting a transmission speed of an electronic aid includes the steps of making a rate negotiation between the electronic aid and a computer, judging whether the rate negotiation is successful or not, if it is successful but data can not be transferred between the electronic aid and the computer, the computer will self-correct the transmission speed of the electronic aid. The present invention ensures that the electronic aid, which can not work normally at high-speed, works normally after deceleration, thereby improving the compatibility of the electronic aid.

4 Claims, 2 Drawing Sheets

METHOD FOR ADJUSTING THE TRANSMISSION SPEED OF THE ELECTRONIC AID

BACKGROUND OF THE PRESENT INVENTION

1. Field of Invention

The present invention relates to a method for adjusting the transmission speed, and more particularly to a method for adjusting the transmission speed of the electronic aid, which is capable of self-correcting the transmission speed of the electronic aid.

2. Description of Related Arts

With the development of the electric industry, more and more electronic aids have been widely used, such as the USB (Universal Serial Bus) 2.0 high-speed electronic aids (including U disks, MP3s, card readers and so on). These electronic aids are connected with computers by USB interfaces to acquire the data from the computers, or transfer the data to the computers for achieving their functions. However, the quality of the connecting lines of some existing USB 2.0 electronic aids is getting worse and worse, so the performances of these electronic aids are decreased while working. Under some bad conditions, some devices may not work normally.

Referring to FIG. 1, a flow chart of a computer identification electronic aid of the prior art is shown. According to the USB 2.0 protocol, it is necessary for the USB 2.0 electronic aid to firstly make a rate negotiation with the computer before the USB 2.0 electronic aid works normally. If the electronic aid supports the high-speed operation mode, the electronic aid will firstly make the rate negotiation of the high-speed transmission speed with the computer. After the success of the negotiation, the computer begins to send the high-speed data packet to the electronic aid for identifying and initially configuring the electronic aid, such that the electronic aid begins to work normally. If the high-speed rate negotiation between the electronic aid and the computer is unsuccessful, the electronic aid will automatically switch to the full-speed operation mode, such that the data are transferred between the electronic aid and the computer. However, if the high-speed rate negotiation between the electronic aid and the computer is successful, but the data still can not be transferred normally between the electronic aid and the computer, the electronic aid will not work normally. According to the USB 2.0 protocol, under the condition that the electronic aid can not work normally, the computer has three opportunities to retry. For every opportunity, the computer firstly makes the rate negotiation with the electronic aid, if it works, the data packet will be sent to the electronic aid. If the data still can not be transferred normally between the electronic aid and the computer after three retrials, the electronic aid will not be identified. Therefore, the electronic aid can not work normally.

SUMMARY OF THE PRESENT INVENTION

An object of the present invention is to provide a method for adjusting the transmission speed of the electronic aid, which is capable of self-correcting the transmission speed of the electronic aid when the high-speed rate negotiation between the electronic aid and the computer is successful, but the data still can not be transferred normally between the electronic aid and the computer.

Accordingly, in order to accomplish above object, the present invention provides a method for adjusting a transmission speed of an electronic aid, comprising the steps of:

(1) making a rate negotiation between the electronic aid and a computer; and (2) judging whether the rate negotiation is successful by the computer, if it is successful, but data can not be transferred between the electronic aid and the computer, the computer will self-correct the transmission speed of the electronic aid.

Compared with the prior art, in the method for adjusting the transmission speed of the electronic aid of the present invention, when the high-speed rate negotiation between the electronic aid and the computer is successful, but the data still can not be transferred between the electronic aid and the computer, the electronic aid will be self-corrected to the full-speed operation mode, such that the data are transferred between the electronic aid and the computer. Therefore, the present invention ensures that the electronic aid, which can not work normally at high-speed, works normally after deceleration, thereby improving the compatibility of the electronic aid.

DETAILED DESCRIPTION OF THE PREFERRED EMBODIMENT

A method for adjusting the transmission speed of the electronic aid according to a preferred embodiment of the present invention is provided, which is adapted for transferring data between an electronic aid and a computer. A monitoring module is preset in the computer. In the preferred embodiment, the electronic aid is a USB 2.0 high-speed electronic aid which has two operation modes, namely, the full-speed operation mode and the high-speed operation mode. The monitoring module can automatically monitor whether the electronic aid and the computer are prepare to make the third rate negotiation or not. If it's ok, judge whether the condition, that the former two high-speed rate negotiations are successful but the data still can not be transferred normally between the electronic aid and the computer, is met. Therefore, when the electronic aid and the computer make the rate negotiation, the computer will automatically monitor the rate negotiation between the electronic aid and the computer by the monitoring module.

According to the setting, the number of rate negotiations between the electronic aid and the computer can be monitored by the monitoring module, and it is not limited to be the third time, but includes the second time and the second above.

Figure 1:
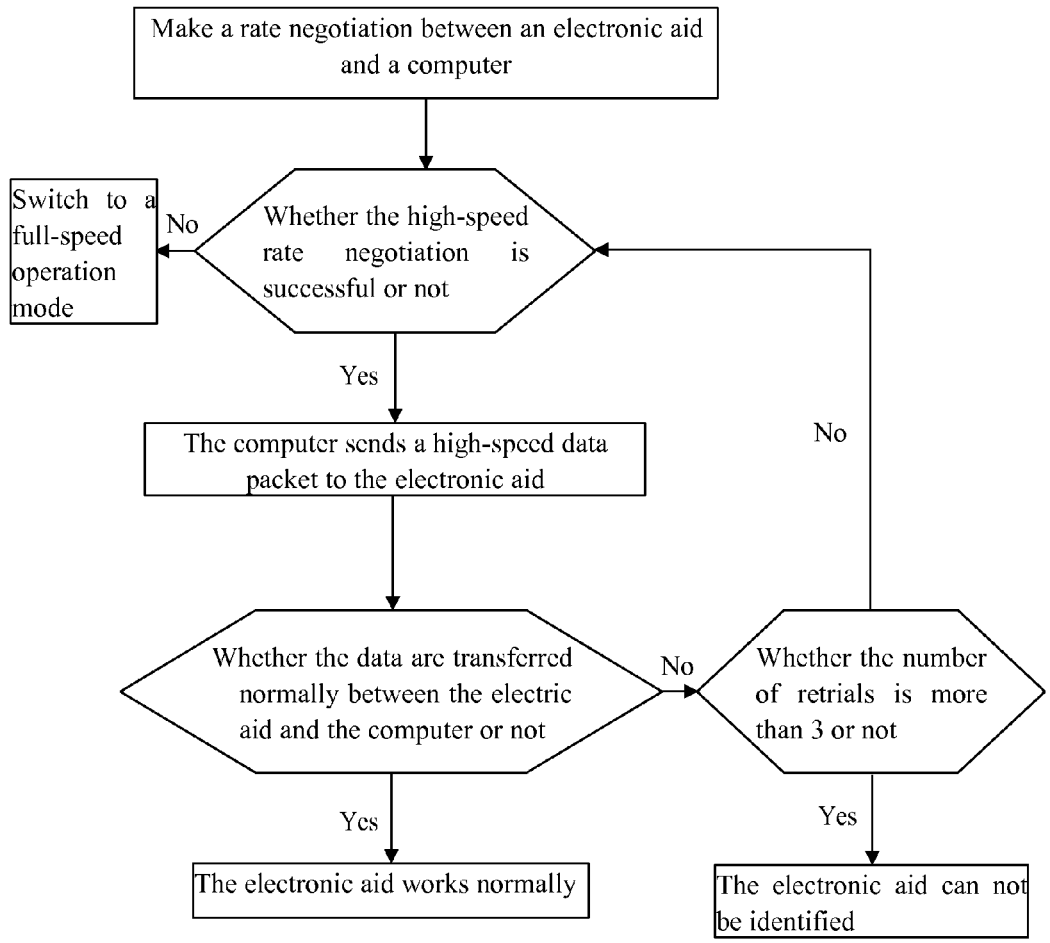
FIG. 1 is a flow chart of an identification electronic aid of the prior art.
Figure 2:
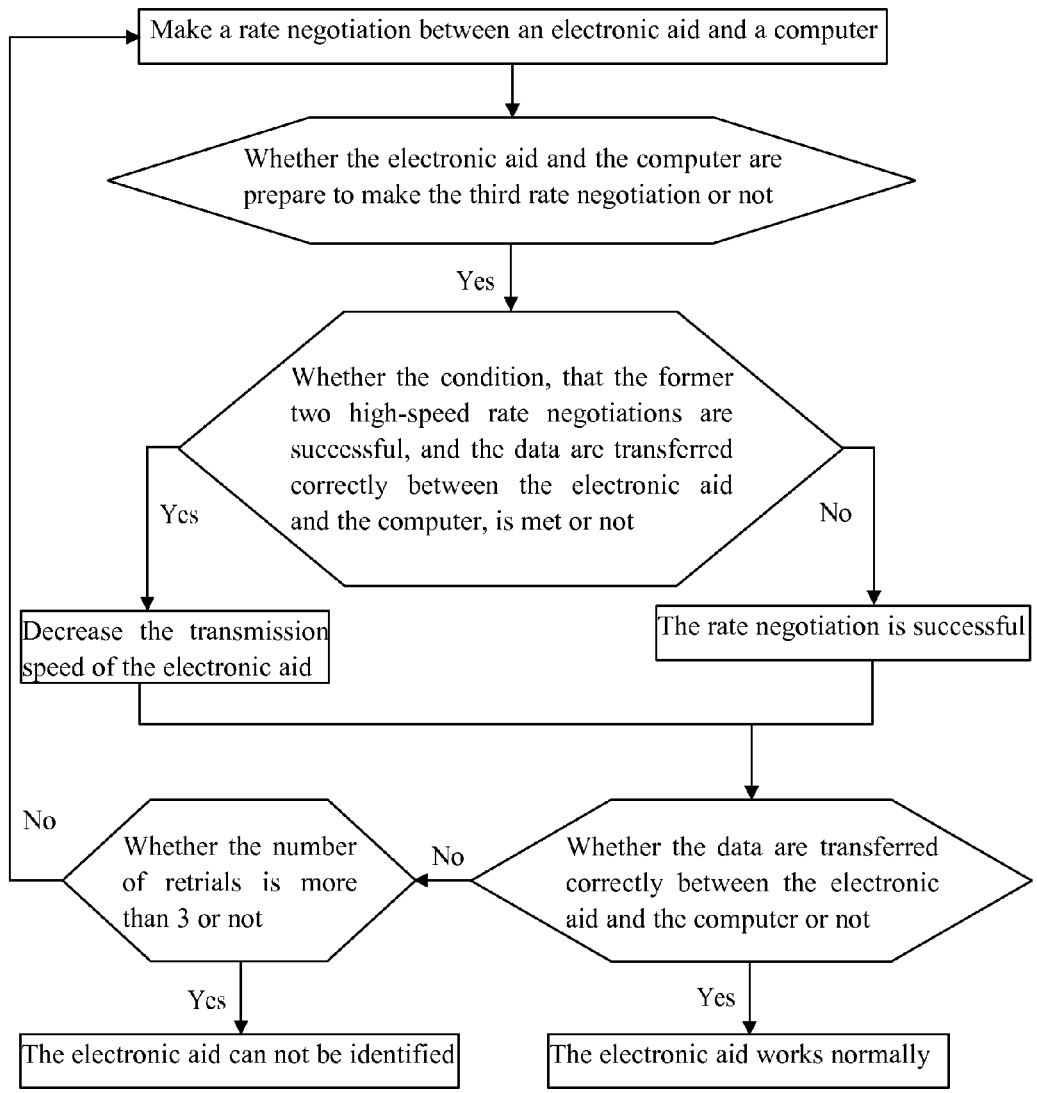
FIG. 2 is a flow chart of a method for adjusting the transmission speed of the electronic aid according to a preferred embodiment of the present invention.

Referring to FIG. 2, a method for adjusting the transmission speed of the electronic aid according to the preferred embodiment of the present invention comprises the steps as below.

(1) Make the rate negotiation of the high-speed transmission speed between the electronic aid and the computer. If the rate negotiation is unsuccessful, the electronic aid will automatically switch to the full-speed operation mode, and then go into step (3). If the rate negotiation is successful, but data can not be transferred normally between the electronic aid and the computer, the electronic aid and the computer will make a rate re-negotiation, and go into the next step.

(2) The computer monitors whether the electronic aid and the computer are prepare to make the third rate negotiation or not by the monitoring module. If it's ok, judge whether the condition, that the former two high-speed rate negotiations are successful but the data still can not be transferred normally between the electronic aid and the computer, is met. If the condition is met, the transmission speed of the electronic aid will be adjusted to the full-speed operation mode, namely, the transmission speed of the electronic aid is decreased, and the computer will send a full-speed data packet to the electronic aid. If the condition is not met, the high-speed rate negotiation between the electronic aid and the computer will be successful, and the computer will send a high-speed data packet to the electronic aid.

(3) The electronic aid receives the high-speed data packet or full-speed data packet sent by the computer. The computer judges whether the data can be correctly transferred between the electronic aid and the computer, if it's ok, the electronic aid will begin to work normally; if it isn't ok, turn back to step (1), the electronic aid and the computer will make the rate re-negotiation. If the number of retrials is more than N, but the data still can not be normally transferred between the electronic aid and the computer, the electronic aid will not be identified. In the preferred embodiment, N is equal to 3.

In step (1), if the rate negotiation is successful, but the data can not be normally transferred between the electronic aid and the computer, directly go to step (2). In step (2), the computer can directly monitor whether the condition, that the rate negotiation between the electronic aid and the computer is successful but the data still can not be normally transferred between the electronic aid and the computer, is met. There is no need to monitor the number of rate negotiations between the electronic aid and the computer. In other words, as long as the computer monitors that the condition, that the rate negotiation between the electronic aid and the computer is successful but the data still can not be normally transferred between the electronic aid and the computer, is met, the transmission speed of the electronic aid will be adjusted to the full-speed operation mode, such that the data can be transferred normally between the electronic aid and the computer.

In the method for adjusting the transmission speed of the electronic aid of the present invention, when the high-speed rate negotiation between the electronic aid and the computer is successful, but the data still can not be transferred normally between the electronic aid and the computer, the electronic aid will be automatically decelerated to the full-speed operation mode, such that the data can be transferred between the electronic aid and the computer. Therefore, the present invention ensures that the electronic aid, which can not work normally at high-speed, works normally after deceleration, thereby improving the compatibility of the electronic aid.

What is claimed is:

1. A method for adjusting a transmission speed of an electronic aid, comprising the steps of:
   (1) making a rate negotiation between the electronic aid and a computer; and
   (2) judging whether the rate negotiation is successful by the computer, wherein if it is successful, but data can not be transferred between the electronic aid and the computer, the computer will self-correct the transmission speed of the electronic aid,
   wherein in step (2), if the rate negotiation is unsuccessful, the transmission speed between the electronic aid and the computer will be self-corrected to a full-speed operation mode,
   wherein if the rate negotiation is successful but the data between the electronic aid and the computer can not be transferred, the electronic aid and the computer will make a rate re-negotiation,
   wherein a monitoring module is provided in the computer, the monitoring module automatically monitoring whether the electronic aid and the computer are prepared to make a third rate negotiation; if so, the monitoring module further judging whether the previous two high-speed rate negotiations are successful but the data still can not be transferred normally between the electronic aid and the computer; and if so, the transmission speed of the electronic aid being self-corrected by the computer.

2. The method, as recited in claim 1, wherein the electronic aid is a USB 2.0 high-speed electronic aid.

3. The method, as recited in claim 2, wherein the rate negotiation is a rate negotiation of a high-speed transmission speed.

4. The method, as recited in claim 1, wherein the rate negotiation is a rate negotiation of a high-speed transmission speed.

* * * * *